(12) United States Patent
Suzuki et al.

(10) Patent No.: US 6,765,320 B1
(45) Date of Patent: Jul. 20, 2004

(54) ACTUATOR

(75) Inventors: Yuzuru Suzuki, Shizuoka-ken (JP);
Sakae Fujitani, Shizuoka-ken (JP);
Masaki Kagawa, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/541,825

(22) Filed: Apr. 3, 2000

(30) Foreign Application Priority Data

Apr. 6, 1999 (JP) .......................................... 11-098705

(51) Int. Cl.⁷ ............................ H02K 1/12; H02K 1/00; H02K 19/26
(52) U.S. Cl. .................... 310/49 R; 310/257; 310/254; 310/180
(58) Field of Search .............................. 310/257, 49 R, 310/156, 254, 180, 15–35; 335/272–274; 417/416; 318/685

(56) References Cited

U.S. PATENT DOCUMENTS

| | | | | |
|---|---|---|---|---|
| 3,652,884 A | * | 3/1972 | Vuffray ...................... 310/156 |
| 4,656,381 A | * | 4/1987 | Komatsu ...................... 310/257 |
| 4,691,135 A | * | 9/1987 | Sogabe et al. .............. 310/254 |
| 5,034,642 A | * | 7/1991 | Hoemann et al. ...... 310/156.47 |
| 5,969,453 A | * | 10/1999 | Aoshima ...................... 310/156 |
| 6,172,440 B1 | * | 1/2001 | Sasaki et al. ............... 310/156 |
| 6,331,746 B1 | * | 12/2001 | Fujitani et al. ............. 310/263 |

* cited by examiner

Primary Examiner—Tran Nguyen
Assistant Examiner—J. Aguirrechea
(74) Attorney, Agent, or Firm—Fay, Sharpe, Fagan, Minnich & McKee, LLP

(57) ABSTRACT

The present invention provides a rotor magnet with a claw pole type of actuator of a single phase structure and a magnetization method of the rotor magnet, in which detent and dynamic torques are sufficiently ensured, an angle range of rotational operation is wide, the cost is inexpensive and the characteristics are stable. In the actuator of such structure, the rotor magnet is rotatably arranged through a fine space inside an armature coil, wherein the rotor magnet comprises a single cylindrical type of magnet having a distribution pattern of a magnetic flux in which the magnetic pole peak position of at least one of the N and S poles is shifted stepwise in the axial direction thereof.

11 Claims, 7 Drawing Sheets

ACTUATOR

BACKGROUND OF THE INVENTION

1. Field of the Invention

The present invention relates to a rotor structure of a claw pole type of actuator of a single phase structure, and more specifically, it relates to a rotor magnet structure and a magnetization pattern of an actuator that is inexpensive, is easy to assemble, and has stable characteristics of repetitive rotational operation.

2. Description of the Prior Arts

In an actuator in which an electric rotating machine of a single phase structure with a claw pole type of structure is provided with a stop mechanism so as to enable a rotor to be repetitively rotatably operated by excitation of a coil, it is desired to increase a dynamic torque while ensuring a detent torque and to increase an angle range of rotational operation.

Conventionally, the following two methods have been proposed on the side of a rotor magnet to increase a dynamic torque while ensuring a detent torque and to increase an angle range of rotational operation.

In the first method, a magnet with magnetic anisotropy is used and a groove or a cut is provided along an axial direction of the magnet in a magnetic pole center portion of one of the poles (e.g., only N pole) so that the magnetic balance between N and S poles may be disturbed to expand an angle range of rotational operation. In the second method, a cylindrical type of rotor magnet is divided into a plurality of parts in the axial direction thereof so that the magnetic poles of the parts are shifted in their peripheral direction, laminated and fixed.

However, the first method has such drawbacks that many steps are required to ensure the precision of the shape of the groove or the cut (specifically, the central angle of the groove or the cut), with the result that processing is complicated. Particularly, in case of a sintered magnet whose outer periphery needs to be ground after sintering, the magnet with such groove or cut on the outer periphery has difficulty to ensure not only the degree of cylindricality but also the stable maintenance of a shape of the groove or the cut. Also, there is a drawback that machining of the groove or the cut causes an increase in cost.

In the second method in which magnets are laminated, it is difficult to perform the work In which a plurality of cylindrical magnets are laminated and fixed in the axial direction thereof while ensuring the concentricity and the appropriate shifted amounts of the magnetic pole peak positions. Assembly work after magnetization has further difficulty caused by repulsion effect between divided magnets (since the magnets should be set to repulse each other for shifted amounts of 20 to 60 degrees of an electrical angle.) and causes unstable shifted amounts.

Thus, it is desired that a rotor magnet is composed, employing a single cylindrical type of magnet in order to compose this type of actuator at a low cost.

SUMMARY OF THE INVENTION

The present invention has been attained in view of the aforementioned problems and it is an object of the present invention to provide an actuator of a single phase claw pole structure with a rotor magnet structure which sufficiently ensures detent torque and dynamic torque, has characteristics of wide angle range of rotational operation, is inexpensive, and has stable characteristics, and a magnetization method of the rotor magnet.

In order to solve the above-mentioned problems, an actuator of a single phase structure according to the present invention is characterized in that the rotor magnet comprises a single magnet whose magnetic pole peak position of at least one of N and S poles on the surface thereof shifts stepwise in the axial direction thereof.

According to another aspect of the present invention, a claw pole type of actuator of single phase structure comprises (a) a stator yoke composed of a pair of substantially circular plane yokes formed of soft magnetic materials, pole teeth which axially protrude from an inner circumferential edge of the respective plane yokes and which are disposed to face each other, extending in an axial direction, and a cylindrical ring provided on an outer circumferential edge of one of said plane yokes;

(b) an armature being constituted by installing a coil formed by winding a magnet wire in a coil receiving section shaped like an annular recess formed by said plane yokes, said pole teeth, and said cylindrical ring of said stator yoke: and (c) a stator assembly which has flanges with bearings provided on both end surfaces of said armature and in which a rotor provided with a magnet for a magnetic field composed of a permanent magnet being installed to face said pole teeth of said stator with a minute gap provided therebetween; wherein the rotor magnet has a cylindrical shape, and magnetic pole peak positions of at least one of N and S poles thereof shift stepwise in the axial direction thereof.

An actuator according to the present invention is characterized in that the rotor magnet has two distribution patterns of magnetic flux density in the axial direction thereof.

An actuator according to the present invention is characterized in that the rotor magnet is of magnetic anisotropy.

An actuator according to the present invention is characterized in that shifted amounts of the magnetic pole peak positions of N and S poles at axially stepwise different positions on the rotor magnet are equal.

An actuator according to the present invention is characterized in that the shifted amount of the magnetic pole peak positions of the rotor ranges from 20 to 60 degrees in terms of an electrical angle.

An actuator according to the present invention is characterized in that the rotor has two magnetic poles.

DETAILED DESCRIPTION OF THE PREFERRED EMBODIMENTS

The present invention will now be explained below with reference to the drawings.

First, a first embodiment of an actuator according to the present invention will be explained with reference to FIG. 1.

Figure 1:
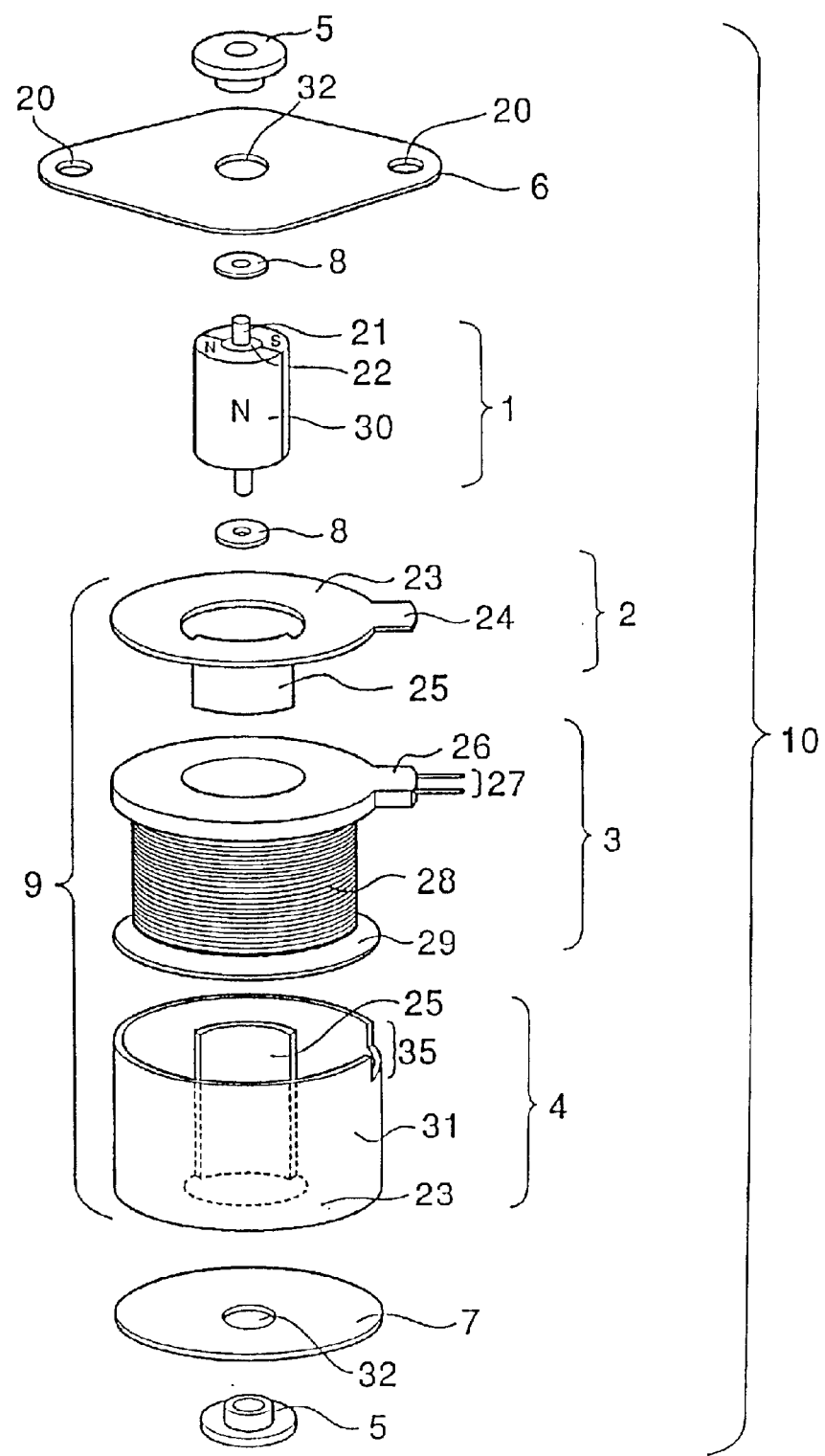
FIG. 1 is an exploded perspective view of an actuator according to the present invention.

FIG. 1 is an exploded perspective view of an actuator according to the present invention and shows a rotor magnet with two poles. The actuator as shown is an example comprising a first stator yoke 2 in which a flat plate-like yoke portion 23 and a pole tooth 25 are integrally formed and a second stator yoke 4 in which a plane yoke portion 23, a pole tooth 25, and a cylindrical ring 31 are integrally formed.

An actuator 10 is constituted by four portions, that is, a rotor 1, an armature 9, front and rear flanges 6 and 7, flange 6 having mounting holes 20 and bearings 5.

In the rotor 1, a magnet 30 which has two magnetic poles of an N pole and an S pole is magnetized such that the magnetic flux is distributed in a state (the detail will be described later) in which the magnetic pole peak position is axially shifted stepwise by an electrical angle of 40 degrees (in the embodiment as shown, since the number of magnetic poles is 2, the electrical angle and the mechanical angle are equal). The magnet 30 is coaxially fixed to a rotary shaft 21 via a sleeve 22. In the present embodiment, the magnet 30 and the sleeve 22 are fixed to the rotary shaft 21 by means of adhesives.

The armature 9 is composed of the first stator yoke 2, a coil assembly 3, and the second stator yoke 4. In the first stator yoke 2 according to the present embodiment, the pole tooth 25 extends integrally in the axial direction from an inner circumferential edge of a substantially doughnut shaped plane yoke portion 23. Specifically, in the present embodiment, the pole tooth 25 is formed in such a manner that a center portion of a disc-shaped soft magnetic steel plate (pure iron plate zinc galvanized steel plate or the like) is punched axially and raised. The plane yoke portion 23 is provided with a positioning protrusion 24 for determining a positional relationship with respect to the second stator yoke 4 in its circumferential direction.

The coil assembly 3 is formed in such a manner that a coil 28 is wound up on a resin bobbin 29 (the material of resin may be, for example, a liquid crystal polymer). In the present embodiment, a terminal block 26 into which terminals 27 are inserted is integrally resin molded with a collar portion of the bobbin 29. This terminal block 26 is constructed so as to be fitted into a notch 35 of the second stator yoke 4 which will be discussed hereinafter.

The second stator yoke 4 is similar to the first stator yoke 2 in that another pole tooth 25 which has an circumferential extension from the inner circumferential edge of the plane yoke portion 23 integrally protrudes in the axial direction. However, the second stator yoke 4 is different from the first stator yoke 2 in that on the outer circumferential edge of the plane yoke portion 23 a cylindrical ring 31 is integrally and axially formed parallel to the pole tooth 25 by means of drawing. As described earlier, the ring 31 of the second stator yoke 4 is provided with the notch 35 for positioning so that the pole tooth 25 of the first stator yoke 2 and the pole tooth 25 of the second stator yoke 4 are positioned in the circumferential direction thereof to form a phase difference of 180 degrees in terms of an electrical angle and for accommodating the terminal block 26 of the coil assembly 3.

The rotor 1 is arranged inside the armature 9, the bearings 5 are attached to center holes 32 of the front and rear flanges 6 and 7, respectively, so that the rotor 1 is rotatably supported by means of these bearings 5. Washers 8 are provided so as to axially position the magnet 30 to the pole tooth 25 to regulate an axial play thereof.

Although fixation between the front and rear flanges 6, 7 and the bearings 5 and fixation between the front and rear flanges 6 and 7 and the first and second stator yokes 2 and 4 are performed by means of adhesives in the present embodiment, they may be alternatively fixed by mechanical caulking, welding, resin integral molding, or the like. The flanges 6 and 7 may be constituted by resin molding.

The principle of operation of a claw pole type of actuator of a single phase structure according to the present invention and the torque characteristics thereof will now be explained.

Figure 2A:
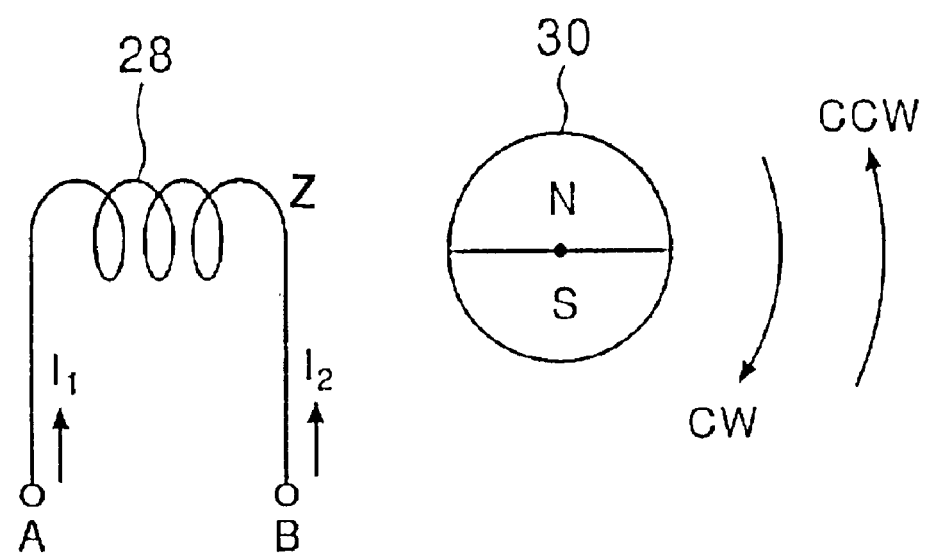
FIG. 2A is a view explaining an operational principle of an actuator according to the present invention by way of an example of a bipolar drive with a unifilar winding.
Figure 2B:
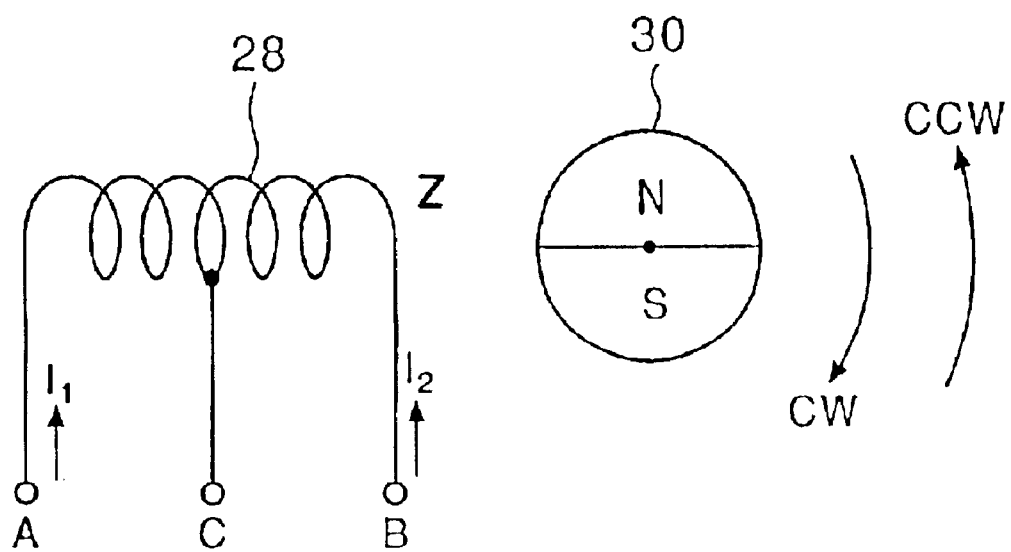
FIG. 2B is a view explaining the same principle by way of an example of a unipolar drive with a bifilar winding.
Figure 3:
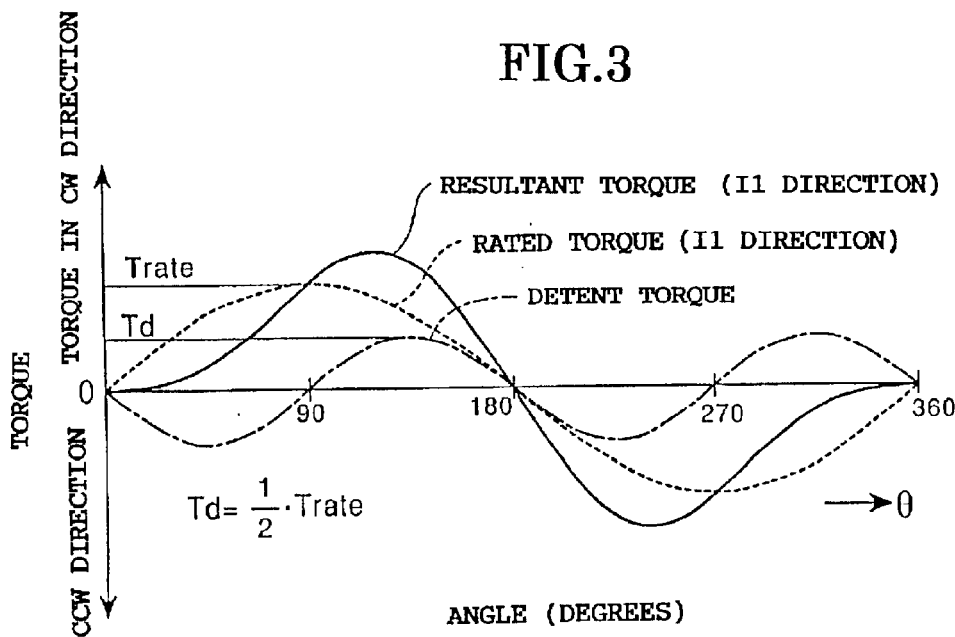
FIG. 3 is a graph showing torque characteristics of an actuator according to the present invention.
Figure 4:
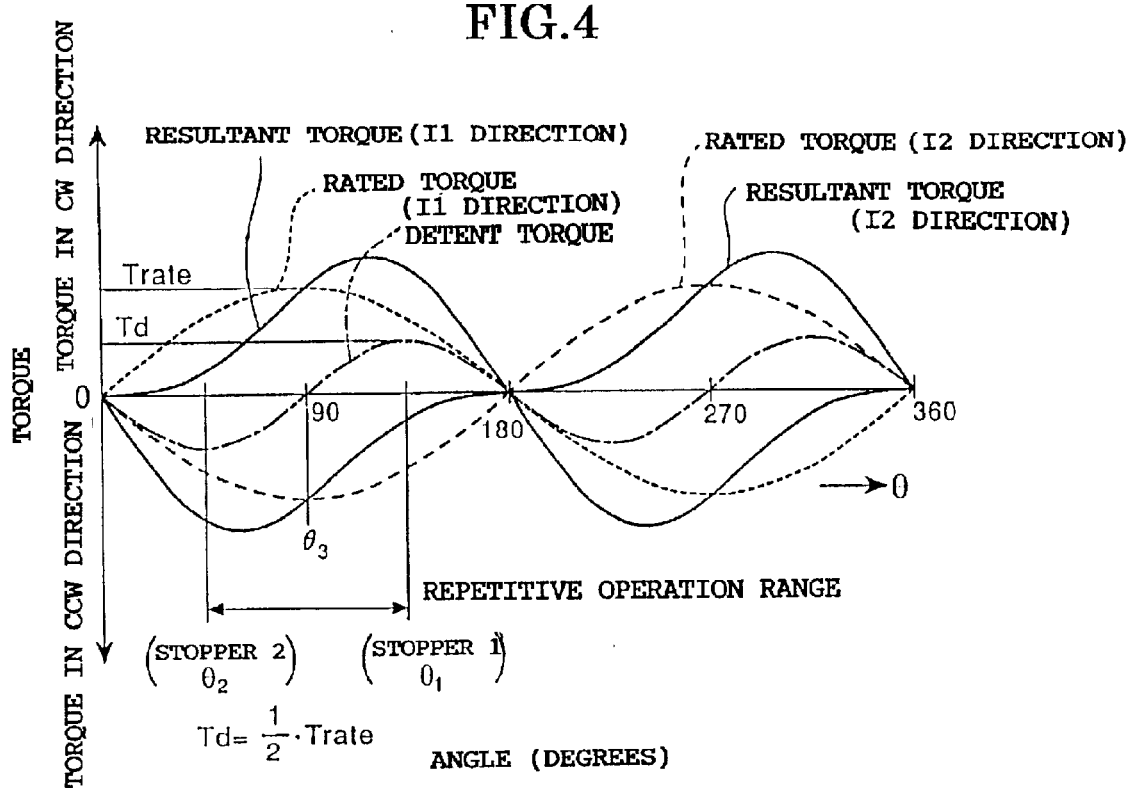
FIG. 4 is a graph showing torque characteristics of an actuator according to the present invention.

FIGS. 2A and 2B are explanatory views showing the principle of operation and FIGS. 3 and 4 show torque characteristics. FIG. 2A shows an example of a bipolar drive with a unifilar winding, and FIG. 2B shows an example of a unipolar drive with a bifilar winding. Since principles of both examples are similar, the example of the drive of FIG. 2A will be explained below.

FIG. 2A shows the coil 28 which represents a stator portion and the rotor magnet 30 which represents a rotor portion. In the present embodiment, although the magnetic pole peak positions of the N and S poles of the rotor magnet 30 are shifted when viewed along the axial direction thereof (which will be described hereinafter), explanation will be given as if FIG. 2A represents resultant equivalently composed.

The coil 28 has two modes, in one of which an electric current $I_1$ is caused to flow from a terminal A, and in the other of which another electric current $I_2$ is caused to flow from a terminal B. First, when the electric current $I_1$ flows to excite the coil 28, a coil end Z close to the rotor magnet 30 is excited to become the N pole. Thus, as the side of the S pole of the rotor magnet 30 is attracted toward the coil end Z of the coil 28, torque in a clockwise (CW) direction is generated. The rotor magnet 30 is stopped with its S pole opposite to the coil end Z of the coil 28 (wherein the rotor magnet is rotated by 90 degrees in the CW direction from the state of the rotor magnet 30 shown in FIGS. 2A and 2B).

When the electric current $I_2$ flows from the terminal B to excite the coil 28, in turn, the coil end Z close to the rotor magnet 30 is excited to become the S pole. Thus, the N pole of the rotor magnet 30 is attracted toward the coil end Z of the coil 28, and torque in a counter clockwise (CCW) direction is generated as a result. The rotor magnet 30 is stopped with its N pole opposite to the coil end Z of the coil 28 (wherein the rotor magnet is rotated by 90 degrees in the CCW direction from the state of the rotor magnet shown in FIGS. 2A and 2B). Thus, when there is no force to restrict the rotation of the rotor magnet 30, the actuator, according to the principle, may be operated in repetitive rotation mode of 180 degrees (±90 degrees) by the excitation.

However, since the actuator according to the present invention is of a claw pole structure, it has a detent torque at the time of no excitation. Therefore, when a friction torque is ignored, a resultant torque may be the vector sum of the detent torque and the excitation torque (in the present invention, a torque generated when the coil is excited at a rated current is referred to as "rated torque," and its maximum value is represented by Trate). These torque relationships are shown in FIGS. 3 and 4. In FIGS. 3 and 4 showing typical torque characteristics of the first embodiment, the axes of abscissas show relative angle differences θ between the rotor and the stator (in the drawings, shown as "angle"), and the axes of ordinates show a torque value at the moment (in the drawings, shown as "torque"). The detent torque which is approximated to a sinusoidal wave and whose maximum value is shown as Td is a half of the rated torque which is approximated to a sinusoidal wave and whose maximum value is shown as Trate, that is, an example of torque characteristics of Td=Trate/2 is shown. For convenience of explanation, the positive torque corresponds to the CW direction, and the negative torque corresponds to the CCW direction, so as to correspond to the directions in which the rotor rotates as shown in FIGS. 2A and 2B. In FIGS. 3 and 4, solid lines show curves of resultant torque (provided that the electric current flows in the $I_1$ direction of FIGS. 2A and 2B), broken lines show curves of resultant torque (the electric current flows in the same $I_1$ direction), one-dot chain lines show curves of the detent torque. FIG. 4 represents the case of the current direction $I_2$ in addition to the case shown in FIG. 3. As shown in FIG. 3, when an angle θ ranges from 0 to 180 degrees (or 180 to 360 degrees), then the resultant torque produced by the electric current $I_1$ will be positive (or negative), thereby generating the torque in the CW (CCW) direction, so that the rotor magnet rotates in the CW (CCW) direction and stops at the position at which the torque becomes zero, that is, θ=180 (θ=180) degrees. As shown in FIG. 4, when an angle θ ranges from 0 to 180 degrees (or 180 to 360 degrees), the resultant torque produced by the electric current $I_2$ will be negative (or positive), thereby generating the torque in the CCW (CW) direction, so that the rotor magnet rotates in the CCW (CW) direction and stops at the position at which the torque becomes zero, that is, θ=0 (θ=360 and 0 degrees). These explanations correspond to those of FIGS. 2A and 2B.

Relationship among detent torque, repetitive rotational operation range, and a stop mechanism will be explained as it is important characteristics of the present invention.

Again, referring to FIG. 4, the relationship among the detent torque, the repetitive rotational operation range, and the stop mechanism will be explained. In the drawing, when it is assumed that stop mechanisms I and II are respectively provided at the positions of $θ_1$ and $θ_2$, and the rotor is set in a repetitively operable state only within the range between $θ_1$ and $θ_2$, the actuator may operate as follows.

When the rotor is positioned between the positions $θ_1$ and $θ_1$ ($θ_2$ and $θ_3$) with the coil not excited, the detent torque becomes positive (negative), whereby the rotor is stopped and maintained at the position $θ_1$ ($θ_2$) of the stop mechanism I (II) due to the torque exerted in the CW (CCW) direction. In this state, when the electric current $I_2$ ($I_1$) is caused to continuously flow, the rotor defeats the positive detent torque to generate a torque in the CCW (CW) direction and stops at the position $θ_2$ ($θ_1$) of the stop mechanism II (stop mechanism I). When the exciting time by the electric current $I_2$ ($I_1$) is short and the electric current $I_2(I_1)$ is interrupted before the rotor reaches the position $θ_3$, the rotor returns to the initial position $θ_1$ ($θ_2$) due to the positive (negative) detent torque.

When the electric current $I_2$ ($I_1$) is caused to flow for a sufficiently long time, and then the excitation is cut after the rotor is stopped at position $θ_2$ ($θ_1$) of the stop mechanism II (stop mechanism I), the rotor is maintained at that position due to the negative detent torque. In this state, when the electric current is switched to the electric current $I_1$ ($I_2$), the rotor defeats the negative detent torque and in turn generates torque in the CW (CCW) direction to return to and stop at position $θ_1$ ($θ_2$) of the stop mechanism I (stop mechanism II).

As explained above, the rotor is actuated repetitively within the range between the positions $θ_2$ and $θ_1$ every time the excitation of the coil is switched, while the rotor is actuated in a specific direction with no excitation of the coil due to the detent torque. As described earlier, when the excitation time of the coil is continuously changed, actuation time of the rotor is continuously changed correspondingly.

Such feature can be applied for example to opening/closing drive of a valve or the like, whereby the valve is normally closed by a detent torque and may be opened only at the time required to pass gas, fluid, or light by exciting the coil and then be closed by non-excitation. It is very convenient in view of saving power consumption that if the excitation is cut, then the valve is kept closed by the detent torque. It is also convenient that the opening time of the valve may be arbitrarily regulated by the valve opening/closing time corresponding to the excitation/non-excitation time of the actuator. A load shaft with a valve (that may be the rotary shaft 21 of the rotor 1 of the actuator) may be provided with an angle detection device so that a feedback control may be employed in which a valve opening/closing angle is adjusted to an angle command value while angle detection is continuously performed.

Figure 5A:
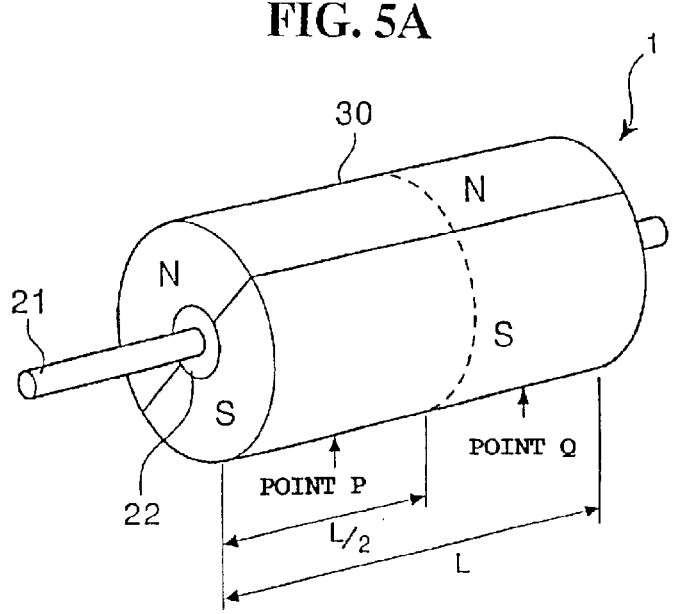
FIG. 5A is a perspective view of a rotor structure of a cylindrical type of rotor magnet used in an actuator according to the present invention and FIG. 5B depicts graphs showing magnetization patterns of the same rotor magnet.

The present invention has a feature that one cylindrical rotor magnet is employed. FIG. 5A shows the rotor structure of an actuator according to the present invention, and FIG. 5B shows the magnetization patterns of the rotor.

The rotor magnet 30 shown in FIG. 5A comprises a single cylindrical magnet with two magnetic poles, and its appearance is substantially the same as a conventional cylindrical type of magnet. However, the rotor magnet 30 has a feature that the distribution of the magnetic flux (density) on the surface of the magnetic pole has peak positions of the N and S magnetic poles shifted in the circumferential direction respectively by the same amount (in the example as shown in FIG. 5A, by an electrical angle of 40 degrees) depending on an axial position. That point will be described in detail below.

Figure 5B:
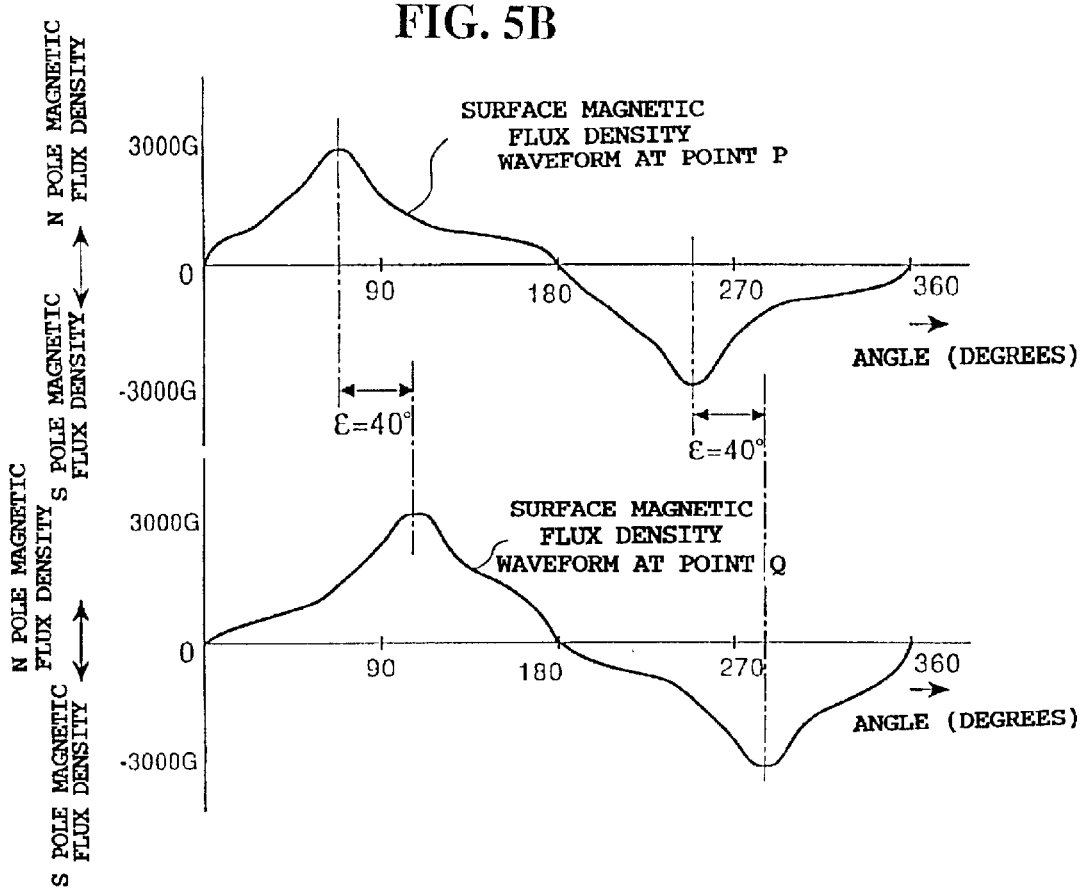

FIG. 5B shows the distribution of values of the magnetic flux (density) on the surface of the rotor magnet 30 measured by means of a gauss meter at Point P (a point that is L/4 apart from the left end of the rotor magnet 30; L is an axial length of the rotor magnet 30) and Point Q (a point that is 3L/4 apart from the left end of the rotor magnet 30) which are selected as typical points in the axial direction of the rotor magnet 30 as shown in FIG. 5A. Two pole distributions of the N pole and S pole can be recognized at either location of the Points P and Q, and the maximum values of the magnetic flux density are equal and are approximately 3,000 Gauss. The magnetic pole peak positions of the N pole and the S pole are characteristically shifted by an electrical angle of 40 degrees. This shifted amount ε corresponds to a shifted amount α of a protruding pole of a magnetization jig which will be described in detail hereinafter. For Points P and Q, the neutral positions are located at positions of 0 degree, 180 degrees and 360 degrees which are approximately of the same phase.

With such effect, a similar effect can be obtained to the prior art in which cylindrical type of magnets are axially coupled to shift each magnetic pole peak position. As a result, a good balance between an operational range and a detent torque of an actuator is attained with the result that an actuator whose operational range is wide and whose detent torque is large has been accomplished by means of a single cylindrical type of magnet. A shifted amount α can be set fixedly by means of a magnetization jig (the detail will be described later), thereby enabling a manufacture of a rotor magnet with high precision and stableness.

Although a sintered type of neodymium magnet of magnetic anisotropy has been explained with reference to FIGS. 5A and 5B, similar effect can be attained with a magnet made of different materials and with different orientation and different number of poles if it is magnetized by a method of the present invention which will be described hereinafter.

Now, a magnetization jig and a magnetization method to accomplish the magnetic flux density distribution patterns of FIG. 5B will be explained.

Figure 6:
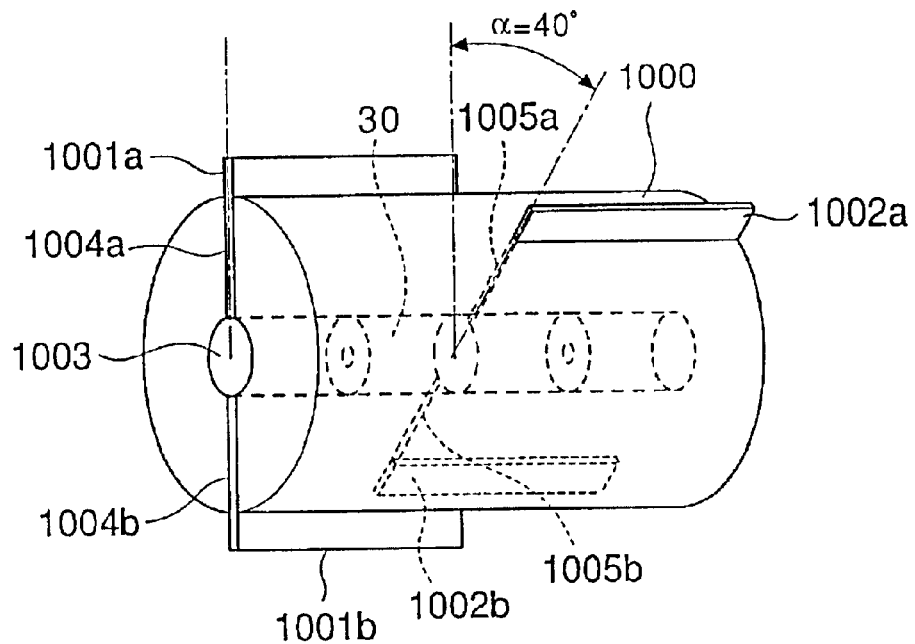
FIG. 6 is a perspective view of a magnetization jig for realizing a magnetization pattern of a rotor magnet used in an actuator according to the present invention.

FIG. 6 shows an example of a magnetization jig for magnetizing a rotor magnet. The magnetization jig comprises a non-magnetic ring 1000 made of aluminum having slits 1004a, 1004b, and 1005a, 1005b formed thereon and a center hole 1003 for accommodating the rotor magnet 30 to be magnetized. In the present embodiment, the rotor magnet 30 has an outer diameter of 2.3 to 2.7 mm and a length of 3.2 to 4.0 mm. In these slits are arranged four protruding poles 1001a, 1001b, and 1002a, 1002b made of soft magnetic plate which is a silicon steel plate in the present embodiment, but may be pure iron or carbon steel and having a thickness of 0.5 mm so as to form a mechanical angle of 180 degrees between the protruding poles 1001a and 1001b and between the protruding poles 1002a and 1002b. The protruding poles 1001a and 1002a are arranged to form an electrical angle of α degrees (FIG. 6 shows the rotor magnet with two magnetic poles and the electrical angle and the mechanical angle being equally 40 degrees). The same relationship is applied to the protruding poles 1001b and 1002b. The protruding poles 1001a and 1002a are arranged to form an electric angle of α degrees. As is already explained, this setting of an electrical angle corresponds to the shifted amount ε of the magnetic pole peak position (as shown in FIG. 5B) when the rotor magnet 30 is magnetized. Accordingly, the shifted amount ε of magnetic pole peak position of the magnetic poles of the rotor magnet 30 can be adjusted by the angle α shown in FIG. 6 which is formed by protruding poles attached on the ring of the magnetization jig. The non-magnetic ring 1000 may be made of resin or ceramics.

It is preferred that the rotor magnet 30 to be magnetized is set inside the center hole 1003 of the ring 1000 so that the axial position is appropriately adjusted so as to equally have influence of the protruding pole 1001a which corresponds to the upper side waveform of FIG. 5B and the protruding pole 1002a which corresponds to the lower side waveform of FIG. 5B as shown in FIG. 6. In case there is an imbalance in a relation of magnetic connection with a rotor magnet between the pole tooth 25 of the first stator yoke 2 and the pole tooth 25 of the second stator yoke 4 shown in FIG. 1 (for example, the shape of the pole tooth 25 of the first stator yoke 2 is different from that of the pole tooth 25 of the second stator yoke 4), it is effective that the axial position is shifted from the center for intentionally making an imbalance so as not to equally have any influences of the protruding pole 1001a and the protruding pole 1002a. The magnetization jig shown in FIG. 6 is intended to axially shift the peak position of the magnetic flux density of the rotor magnet 30 in two steps. By providing pairs of protruding poles in the axial direction (not shown) further on the ring 1000, it is possible to shift the peaks of the magnetic flux density in three steps or more. By devising the shapes of the protruding poles 1001a and 1001b, it is possible to form a skew magnetization so that the peaks are continuously shifted. In this event, the protruding poles 1001a and 1002a (as is the same with the protruding poles 1001b and 1002b) should be shifted stepwise as a matter of course.

Figure 7:
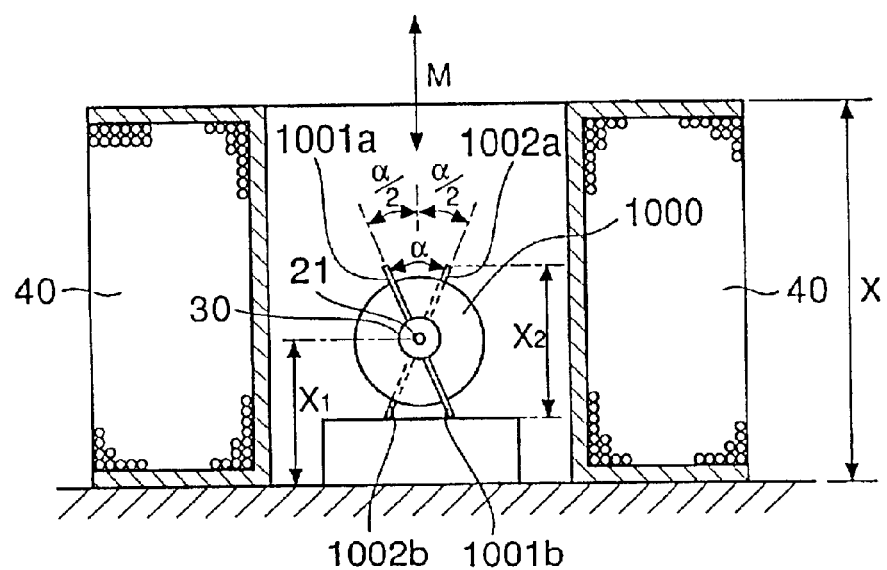
FIG. 7 is a view for explaining a method to magnetize a rotor magnet employed for an actuator according to the present invention.

After the rotor magnet 30 is set in the magnetization jig shown in FIG. 6, the magnetization jig is fixed in a solenoid coil (magnetizing coil) 40 as shown in FIG. 7, and magnetization current is caused to flow in the solenoid coil 40, thereby easily magnetizing the rotor magnet 30 to have the magnetic characteristics shown in FIG. 5B. Since magnetic field is generated in the solenoid coil 40 to the orientation shown by an arrow M, it is preferred that the protruding poles 1001a and 1002a are set so as to form α/2 degrees each other with respect to the orientation of the magnetic field i.e. a vertical direction in the present embodiment. It is desired that a vertical position X/1 of the rotor magnet 30 equals X/2, that is, X/1=X/2 (to be positioned at center), where X Is a height of the solenoid coil and that a height X2 of the magnetization jig is sufficiently shorter than the height X of the solenoid coil 40 (for example X2=X/3 in the present embodiment).

Figure 8:
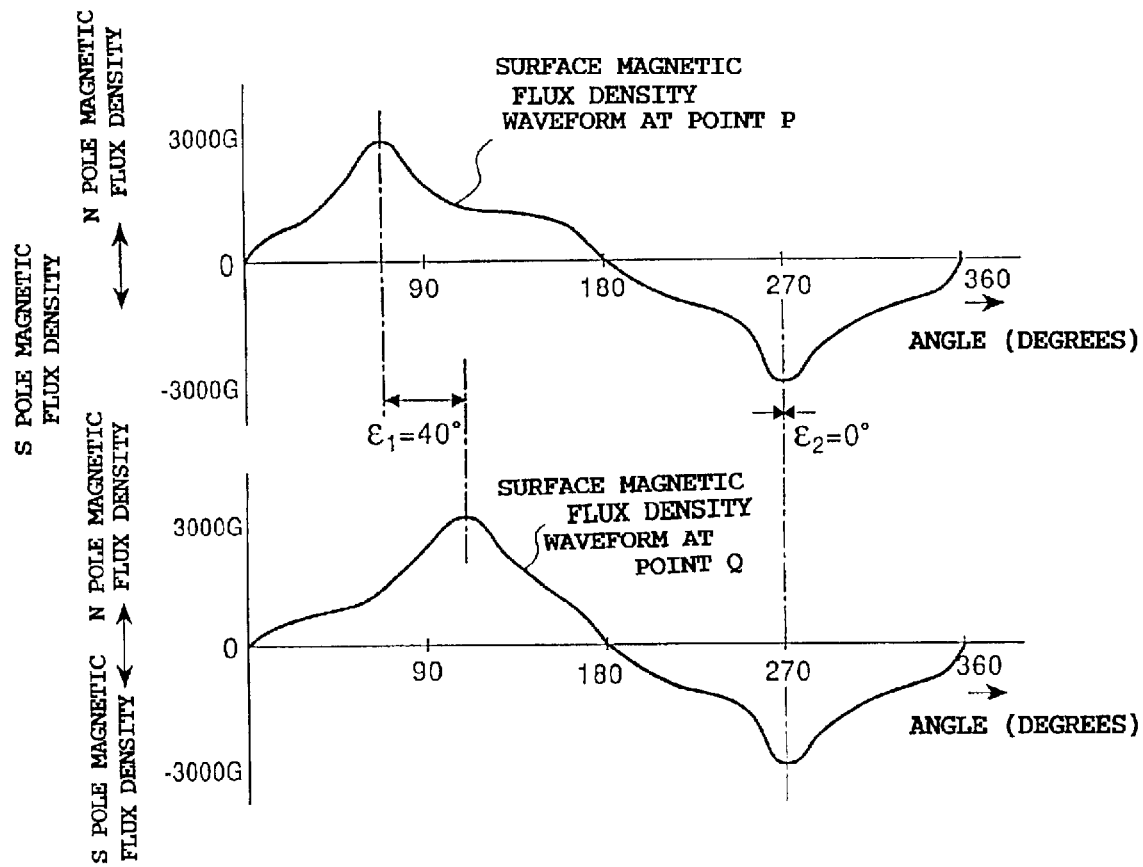
FIG. 8 depicts graphs showing distributions of surface magnetic flux density formed on a rotor magnet used in an actuator according to the present invention.

FIG. 8 shows another embodiment in connection with the rotor 1 shown in FIG. 5A and shows distributions of surface magnetic flux density at Points P and Q in the upper side and the lower side, respectively. As will be seen in FIG. 8, the peak values of the N and S poles are respectively about 3,000 Gauss as similar to those of FIG. 5B. However, it differs from FIG. 5B in the points that although the points where the peak values of the N pole appear are shifted between Points P and Q by ε1=40 degrees, the points where the peak values of the S pole appear are not shifted (ε2=0 degree). Thus, it is possible to shift peak values of either magnetic pole only.

Figure 9:
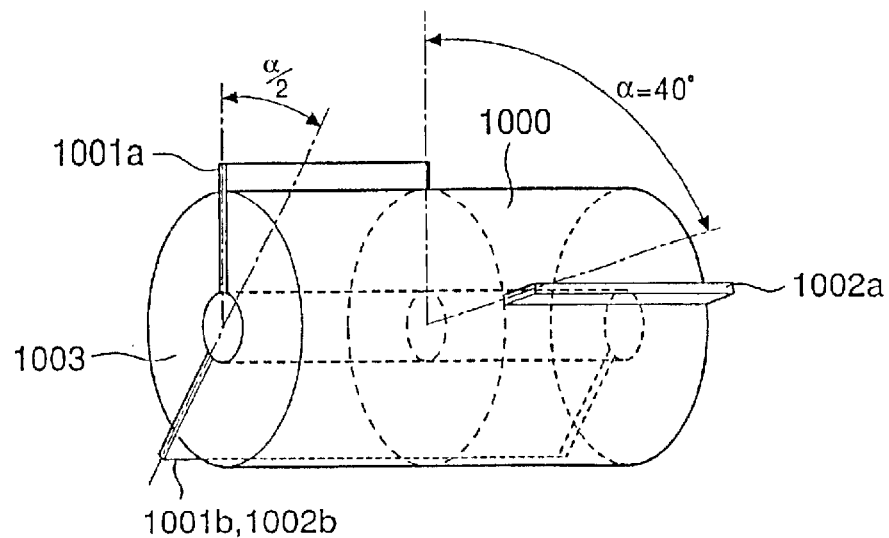
FIG. 9 is a perspective view of a magnetization jig for providing distributions of surface magnetic flux density shown in FIG. 8.

In order to provide distributions of magnetic flux density as shown in FIG. 8, for example, a magnetization jig as shown in FIG. 9 is prepared and magnetization is performed as shown in FIG. 7. In FIG. 9, like reference numerals indicate like components shown in FIG. 6 and detailed explanation is omitted. The magnetization jig shown in FIG. 9 has such features that the protruding poles 1001a and 1001b which are intended to provide distributions of the magnetic flux density shown in the upper side of FIG. 8 do not form angular relationship of an angle of 180 degrees, but form an angle of α/2 degrees and that the protruding poles 1002a and 1002b which are intended to provide distributions of the magnetic flux density in the lower side of FIG. 8 have the same angular relationship as mentioned above that is the relation which does not form 180 degrees. Another feature is that the protruding poles 1001b and 1002b are constituted by the one-piece same non-magnetic plate and have no angle difference therebetween. The protruding poles 1001a and 1002a make an angle of α degrees so that a peak position of the N pole is shifted by this angle α as shown in FIG. 8 when magnetized.

As a matter of course, it is decided according to a magnetic balance of the magnetic circuit whether to equally shift peaks of the magnetic flux density for both N and S poles as shown in FIG. 5B, whether to change the shifted amounts for both poles respectively, or whether to shift for only one magnetic pole as shown in FIG. 8.

By employing the magnetization jig and the magnetization method described above, the balance between a detent torque and an excitation torque may be adjusted even for a cylindrical magnet of high performance pole anisotropy. As a result, a similar effect is obtained likewise in the prior art in which a plurality of magnets are axially coupled, the magnetic poles of adjacent magnets are circumferentially shifted, or a groove or a cut is formed on a peak of one pole of the magnetic poles.

The shifted amount ε of the peak position of the magnetic pole of a rotor magnet whose magnetic pole number is two shown in FIG. 5B will be explained.

Figure 10:
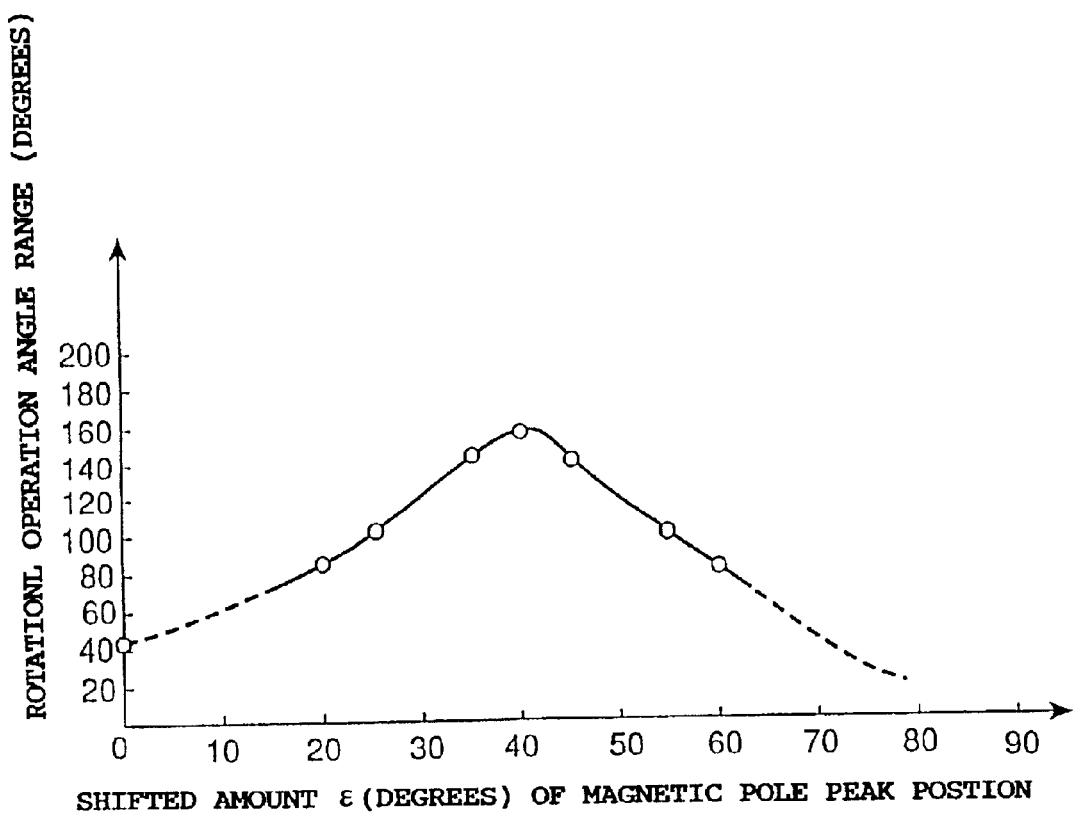
FIG. 10 is a graph showing a change in the rotational operation and the angle range of an actuator when a magnetic pole peak position of a rotor magnet used in an actuator of the present invention is shifted circumferentially.

FIG. 10 shows results of the operation of an actuator obtained while changing the circumferential shifted amount ε of the magnetic pole peak position of the rotor magnet (ε degrees in terms of an electrical angle). In FIG. 10, the axis of abscissa shows a shifted amount ε in terms of an electrical angle of the magnetic pole peak position and the axis of ordinate shows an angle range of rotational operation. It is seen in FIG. 10 that the angle range of the rotational operation may be 90 degrees or more for the shifted amount ε of 20 to 60 degrees. This means that more than a half of a theoretical maximum angle range of rotational operation for the number of magnetic poles=2, i.e. 180 degrees (For more details reference is to be made to FIGS. 2A, 2B and FIG. 3) may be ensured, thereby providing an effective actuator in the present invention. If the shifted amount ε is too small (for example 20 degrees or less), then the detent torque does not sufficiently decrease, so that there is a disadvantage that satisfactory range of rotational operation could not be provided. Particularly, the detent torque remarkably increases at ε=0 and a sufficient rotational operation may not be achieved as already described. On the other hand, if the shifted amount ε is too large (for example 60 degrees or more), then the detent torque becomes large so that there is a similar disadvantage that satisfactory range of rotational operation could not be provided. Strictly speaking, the above tendency, which may depend on the magnet material used and its anisotropy, was particularly remarkable for a sintered type of neodymium magnet having a pole anisotropy.

In the case that the shifts of the magnetic pole peak position are given by two steps or more in the axial direction, it is preferred that the shifted amount ε in degrees of a magnetic pole peak position between respective magnets should be given within an electrical angle range of 20 to 60 degrees.

Although the embodiments have been explained in connection with the rotor having two magnetic poles, the present invention is not limited to such rotor. It is known that the relationship between an electrical angle θe (in degrees) and an mechanical angle θm (in degrees) for a rotor having the number of magnetic poles of H is represented by θm=2θe/H (in degrees).

According to the present invention, it is possible to constitute a rotor magnet by employing a single cylindrical type of rotor magnet which is inexpensively worked with an armature of a claw pole type of actuator of a single phase structure which is of a low cost, and therefore there is an advantage of a simple manufacture. Further, as a magnetic shift can be realized fixedly by means of a magnetization jig alone, it is possible to obtain stable characteristics with high precision.

What is claimed is:

1. A claw pole type of actuator of a single phase structure, comprising:
   a stator yoke comprising a pair of substantially circular plane yokes formed of a soft magnetic material; a plurality of pole teeth which protrude from an inner peripheral edge of the respective plane yokes and which are disposed to face each other, extending in an axial direction; and a cylindrical ring provided on an outer peripheral edge of one of said plane yokes extending in a same direction as said pole teeth;

an armature comprising an armature coil further comprising a magnet wire winding in a coil receiving section shaped like an annular recess formed by said plane yokes, said pole teeth, and said cylindrical ring of said stator yoke;

a stator assembly which has flanges with bearings provided on both end surfaces of said armature and in which a rotor provided with a rotor magnet comprising a permanent magnet facing said pole teeth of said stator yoke with a minute gap provided therebetween, wherein the rotor magnet has a cylindrical shape, and magnetic pole peak positions of at least one of N and S poles thereof are shifted in a circumferential direction as a function of axial position thereof within a range of 20 to 60 degrees in terms of electrical angle; and, a stop mechanism comprising a first stop positioned at a first angle between 0 degrees and 90 degrees in terms of electrical angle and a second stop positioned at a second angle between 90 degrees and 180 degrees in terms of electrical angle, wherein said first and second angles are arranged such that a rotating position of said rotor magnet driven by excitation of the armature coil between 0 and 90 degrees or between 90 and 180 degrees in terms of electrical angle is maintained by a detent torque at said first angle or said second angle respectively thereof upon switching to non-excitation of the armature coil.

2. An actuator according to claim 1, wherein the rotor magnet has two distribution patterns of magnetic flux density in the axial direction thereof.

3. An actuator according to claim 2, wherein the rotor magnet is of magnetic anisotropy.

4. An actuator according to claim 3, wherein shifted amounts of the magnetic pole peak positions of N and S poles at axially stepwise different positions on the rotor magnet are equal.

5. An actuator according to claim 1, wherein the shifted amount of the magnetic pole peak positions of the rotor ranges from 20 to 60 degrees in terms of an electrical angle.

6. An actuator according to claim 1, wherein said rotor has two magnetic poles.

7. An actuator according to claim 1, wherein the magnetic pole peak position shift in a circumferential direction as a function of axial position is a continuous position shift.

8. An actuator according to claim 1, wherein the magnetic pole peak position shift in a circumferential direction as a function of axial position is a stepwise position shift.

9. An actuator of a single phase structure comprising:
   a rotor magnet rotatably arranged about an axis of rotation through a fine space inside an armature coil, wherein said rotor magnet is a single magnet and comprises at least one of N and S poles thereof, wherein the magnetic pole peak position of the magnet is shifted in a circumferential direction as a function of axial position thereof within a range of 20 to 60 degrees in terms of electrical angle; and, a stop mechanism comprising a first stop positioned at a first angle between 0 degrees and 90 degrees in terms of electrical angle and a second stop positioned at a second angle between 90 degrees and 180 degrees in terms of electrical angle, wherein said first and second angles are arranged such that a rotating position of said rotor magnet driven by excitation of the armature coil between 0 and 90 degrees or between 90 and 180 degrees in terms of electrical angle is maintained by a detent torque at said first angle or said second angle respectively thereof upon switching to non-excitation of the armature coil.

10. An actuator according to claim 9, wherein the magnetic pole peak position shift in a circumferential direction as a function of axial position is a continuous position shift.

11. An actuator according to claim 9, wherein the magnetic pole peak position shift in a circumferential direction as a function of axial position is a stepwise position shift.

* * * * *